United States Patent
Corr et al.

(10) Patent No.: US 6,521,022 B1
(45) Date of Patent: Feb. 18, 2003

(54) APPARATUS AND METHOD FOR REDUCING RESIDUAL SOLVENT LEVELS

(75) Inventors: Stuart Corr, Warrington (GB); Paul A. Dowdle, St Helens (GB); Robert E. Low, Northwich (GB); Frederick Thomas Murphy, Frodsham (GB); James David Morrison, Northwich (GB)

(73) Assignee: Ineos Fluor Holdings Limited (GB)

( * ) Notice: Subject to any disclaimer, the term of this patent is extended or adjusted under 35 U.S.C. 154(b) by 0 days.

(21) Appl. No.: 09/654,816

(22) Filed: Sep. 5, 2000

(30) Foreign Application Priority Data

Sep. 6, 1999 (GB) ................................................ 9920950

(51) Int. Cl.[7] .............................................. B01D 19/00
(52) U.S. Cl. .............................. 95/263; 95/265; 96/202; 96/351; 96/353; 261/121.1; 261/124
(58) Field of Search ......................... 95/263, 264, 265, 95/266; 96/202, 351, 352, 353; 261/121.1, 124; 210/188, 634, 908

(56) References Cited

U.S. PATENT DOCUMENTS

| | | | | |
|---|---|---|---|---|
| 3,113,871 A | * | 12/1963 | Webster | 96/202 |
| 4,510,242 A | | 4/1985 | Tedder | |
| 4,518,502 A | * | 5/1985 | Burns et al. | 210/634 |
| 4,772,319 A | * | 9/1988 | Otsuka et al. | 95/263 |
| 4,820,457 A | * | 4/1989 | Jäger | 261/124 |
| 5,092,983 A | | 3/1992 | Eppig et al. | |
| 5,458,789 A | * | 10/1995 | Dickerson et al. | 95/263 |
| 5,490,941 A | * | 2/1996 | Miyabe et al. | 210/908 |
| 5,516,923 A | | 5/1996 | Hebert et al. | |
| 5,599,376 A | * | 2/1997 | Camp | 210/634 |
| 5,678,807 A | * | 10/1997 | Cooper | 266/216 |
| 5,707,673 A | * | 1/1998 | Prevost et al. | 210/634 |
| 5,788,844 A | * | 8/1998 | Olafson | 210/634 |
| 6,224,847 B1 | * | 5/2001 | Powell et al. | 131/298 |

FOREIGN PATENT DOCUMENTS

| | | |
|---|---|---|
| GB | 413307 | 7/1934 |
| WO | WO 94/20486 | 9/1994 |
| WO | WO 99/59607 | 11/1999 |
| WO | PCT/GB00/03355 | 1/2000 |
| WO | WO 00/64555 | 11/2000 |

* cited by examiner

*Primary Examiner*—Duane Smith
*Assistant Examiner*—Jason M. Greene
(74) *Attorney, Agent, or Firm*—Cook, Alex, McFarron, Manzo, Cummings & Mehler, Ltd.

(57) ABSTRACT

Apparatus and methods for reducing residual solvent levels in extracted biomass that is contaminated with HFC solvent that includes sparging the biomass extract with a solvent stripping gas such as air or nitrogen are disclosed. Apparatus for carrying out the method include a vessel (12;25) containing extract (26) and a source of the gas. The source may be in the form of a moveable, hollow wand (27) having a sparging gas outlet; or a fixed gas inlet (30) for bubbling the gas through the extract (26).

6 Claims, 3 Drawing Sheets

APPARATUS AND METHOD FOR REDUCING RESIDUAL SOLVENT LEVELS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention concerns apparatuses and a method for reducing residual solvent levels, especially following "extraction" of biomass. This is the extraction of flavors, fragrances or pharmaceutically active ingredients from materials of natural origin (these materials being referred to as "biomass" in the body of this text).

Examples of biomass materials include but are not limited to flavorsome or aromatic substances such as coriander, cloves, star anise, coffee, orange juice, fennel seeds, cumin, ginger and other kinds of bark, leaves, flowers, fruit, roots, rhizomes and seeds. Biomass may also be extracted in the form of biologically active substances such as pesticides and pharmaceutically active substances or precursors thereto, obtainable, e.g., from plant material, a cell culture or a fermentation broth.

There is growing technical and commercial interest in using near-critical solvents in such extraction processes. Examples of such solvents include liquified carbon dioxide or, of particular interest, a family of chlorine-free solvents based on organic hydrofluorocarbon (HFC) species.

By the term "hydrofluorocarbon" we are referring to materials which contain carbon, hydrogen and fluorine atoms only and which are thus chlorine-free.

Preferred hydrofluorocarbons are the hydrofluoroalkanes and particularly the $C_{1-4}$ hydrofluoroalkanes. Suitable examples of $C_{1-4}$ hydrofluoralkanes which may be used as solvents include, inter alia, trifluoromethane (R-23), fluoromethane (R-41), difluoromethane (R-32), pentafluoroethane (R-125), 1,1,1-trifluoroethane (R-143a), 1,1,2,2-tetrafluoroethane (R-134), 1,1,1,2-tetrafluoroethane (R-134a), 1,1-difluoroethane (R-152a), heptafluoropropanes and particularly 1,1,1,2,3,3-heptafluoropropane (R-227ea), 1,1,1,2,3,3-hexafluoropropane (R-236ea), 1,1,1,2,2,3-hexafluoropropane (R-236cb), 1,1,1,3,3,3-hexafluoropropane (R-236fa), 1,1,1,3,3-pentafluoropropane (R-245fa), 1,1,2,2,3-pentafluoropropane (R-245ca), 1,1,1,2,3-pentafluoropropane (R-245eb), 1,1,2,3,3-pentafluoropropane (R-245ea) and 1,1,1,3,3-pentafluorobutane (R-365mfc). Mixtures of two or more hydrofluorocarbons may be used if desired.

R-134a, R-227ea, R-32, R-125, R-245ca and R-245fa are preferred.

An especially preferred hydrofluorocarbon for use in the present invention is 1,1,1,2-tetrafluoroethane (R-134a).

It is possible to carry out biomass extraction using other solvents, such as chlorofluorocarbons ("CFC's") or hydrochlorofluorocarbons ("HCFC's") and/or mixtures of solvents.

Known extraction processes using these solvents are normally carried out in closed-loop extraction equipment. A typical example 10 of such a system is shown schematically in FIG. 1.

In this typical system, liquified solvent is allowed to percolate by gravity in downflow through a bed of biomass held in vessel 11. Thence it flows to evaporator 12 where the volatile solvent vapor is vaporized by heat exchange with a hot fluid. The vapor from evaporator 12 is then compressed by compressor 13. The compressed vapor is next fed to a condenser 14 where it is liquified by heat exchange with a cold fluid. The liquified solvent is then optionally collected in intermediate storage vessel (receiver) 15 or returned directly to the extraction vessel 1 to complete the circuit.

The extraction of flavors, fragrances or pharmaceutically active components from materials of natural origin using chlorine-free solvents based on HFC's and other solvents as noted is of growing technical and commercial interest. One reason for use of the closed loop extraction circuit of Figure is to avoid the undesirable release of HFC or other solvents to atmosphere.

Residual solvent levels in extracts to be used in foodstuffs are governed by legislation in many countries. The levels of residual solvents in extracts for other applications are generally less strictly defined. Even where legislation does not dictate a specific level of solvent residue, it is generally desirable to minimize the residue levels where economic and practicable to do so. In the prior art, residual solvent residues have been reduced through a combination of heating and evacuation, or in the case of $CO_2$ solvents by relatively mild evacuation alone. Unfortunately the process of heating and evacuation often has a detrimental effect on the aroma of the finished extract, many of the volatile "top note" components having been removed along with the solvent.

One of the key benefits of using a solvent such as 1,1,1,2-tetrafluoroethane (R-134a) for extraction of materials of biological origin is its ability to capture the relatively volatile flavor and fragrance components. In order to maintain the high quality of the extracts obtained with R-134a, a method of reducing the residual solvent levels that does not impact significantly on the organoleptic behavior of the extract is required.

BRIEF SUMMARY OF THE INVENTION

According to a first aspect of the invention there is provided apparatus for reducing residual solvent levels in extracted biomass, comprising a vessel for containing liquid biomass extract contaminated with solvent. The apparatus also comprises a gas supply for sparging biomass extract in the vessel with a solvent stripping vapor.

According to a second aspect of the invention there is provided a method for reducing solvent levels in extracted biomass, comprising sparging liquid biomass extract, contaminated with solvent, with a solvent stripping vapor.

Preferred features of the apparatus and method are set out below and in the appended claims.

There now follows a description of preferred embodiments of the invention, by way of non-limiting example, with reference being made to the accompanying drawings in which:

BRIEF DESCRIPTION OF THE SEVERAL VIEWS OF THE DRAWING(S)

DETAILED DESCRIPTION OF THE INVENTION

Figure 1:
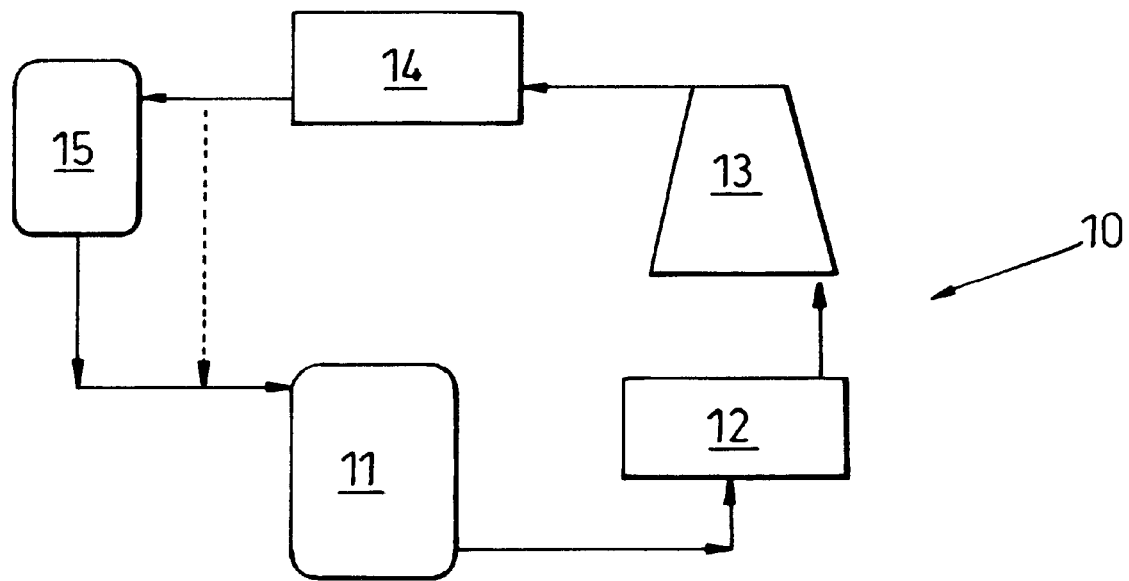
FIG. 1 is a schematic representation of a prior art biomass extraction plant.
Figure 2:
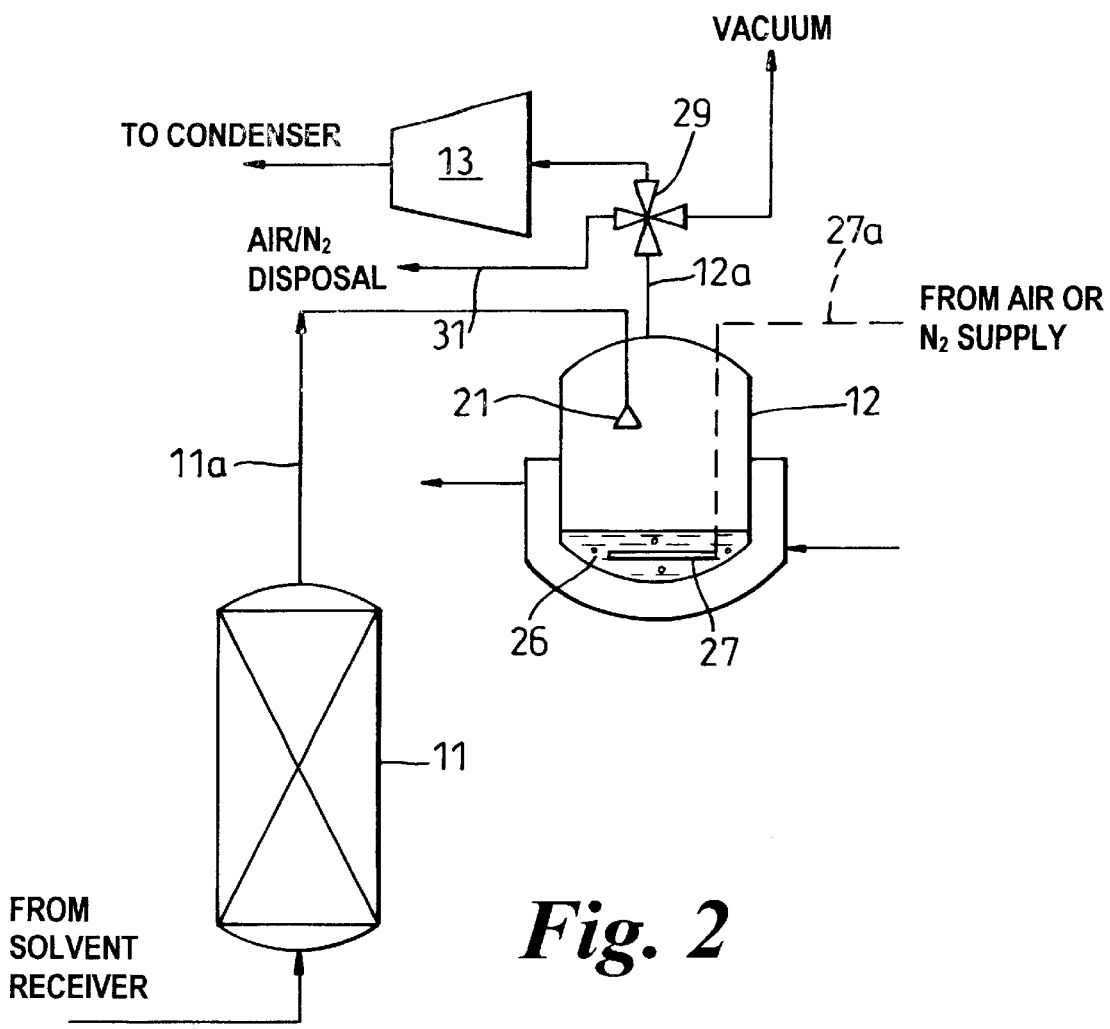
FIG. 2 shows part of the FIG. 1 plant modified to include features in accordance with the invention.

FIG. 2 shows part of the FIG. 1 circuit, modified in accordance with the invention. In FIG. 2 components having the same function as their FIG. 1 counterparts have like reference numerals and are not described again in detail.

The solvent vapor delivery line 12a exiting the upper part of the evaporator 12 is switchably connectable, by means of flow control valve 29, to compressor 13 (when the apparatus is in use to extract biomass); to a vacuum (for purging evaporator 12 at the end of the extraction process) or to a sparging gas disposal line 31.

Flow control valve 29 is controllable, e.g., manually or by means of a computer.

FIG. 2 shows a sparging wand 27 that is immersible into and movable in the biomass extract liquor 26 in evaporator 12 that, during and immediately after extraction, is contaminated with HFC solvent.

Wand 27 may be inserted into evaporator 12, e.g., via an access plate or hatch and submerged under the surface of the extract 26. When sparging gas flows through line 27a and into the hollow interior 27 it exits via the apertures in wand 27 and perfuses through liquor 26.

Figure 3:
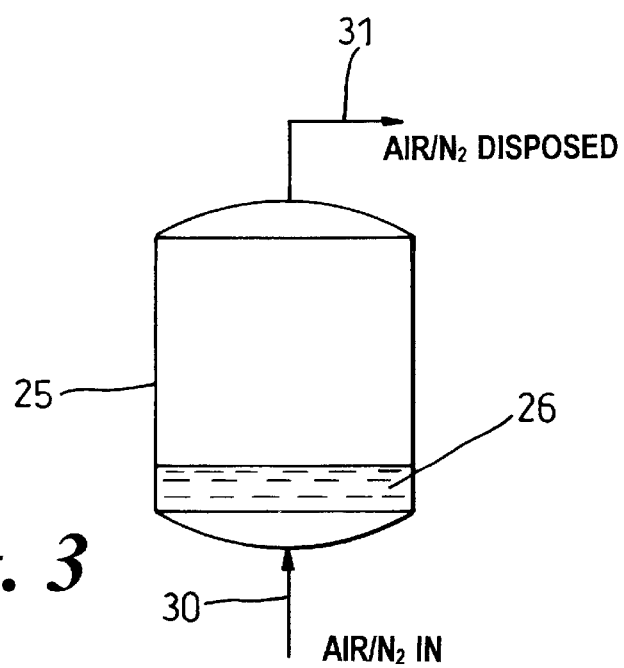
FIG. 3 shows and alternative vessel, according to the invention, in which the invention may be practiced.

An alternative arrangement is shown in FIG. 3, in which the sparging occurs in a hollow vessel 25 remote from evaporator 12. In this case a wand 27 could be used in the same way as in FIG. 2. Alternatively, as shown, a sparging gas (air or $N_2$) supply 30 may be permanently connected via a port beneath the surface of liquor 26 in the vessel 30 or evaporator 12.

The proposed method of residual HFC solvent reduction is as follows. After the extraction process is complete, the collected extract is subject to mild evacuation, e.g., by means of the vacuum connection in FIG. 2, to remove the bulk of the solvent for recovery. At this stage the residual solvent level is likely to be of the order of 10,000 ppm. The sparging gas is then introduced into the extract, e.g., using the wand 27 and sparging is continued at a rate and period sufficient to achieve the desired level of solvent residue, typically of the order of 1–100 ppm.

During sparging the evaporator or vessel outlet may be connected to sparging gas disposal line 31.

This process may be conducted within the evaporator/collector 13 of the extraction equipment (FIG. 2 method); in a separate vessel (FIG. 3 method) or storage container 25 for the extract; or in a countercurrent stripping column where the (liquid) extract is passed over a packing material in contact with the sparging gas. While air can be used as the sparging gas to good effect, the use of nitrogen is beneficial in that it provides an inert atmosphere over the extract thus improving storage stability, especially when sparging is conducted in the extract storage vessel itself. When the extract is in the form of a low melting solid or paste, the extract may beneficially be warmed before sparging, to generate a liquid.

The efficiency of the method of the invention is illustrated by the following non-limiting example:

EXAMPLE

The samples were subjected to a combination of heat (up to 40° C.) and vacuum for known periods of time as well as nitrogen sparging. Graphs were plotted which indicated the rate of removal of 1,1,1,2-tetrafluoroethane ("R-134a").

| | Conditions |
|---|---|
| a | Before |
| b | 10 mins. @ 40 C. |
| c | 10 mins. vacuum @ RT |
| d | 10 mins. vacuum @ 40° C. |
| e | 20 mins. vacuum @ 40° C. |
| f | $N_2$ sparge 10 mins. @ RT |
| g | $N_2$ sparge 20 mins. @ RT |

In order to determine the amount of residual R-134a the extract (0.5 g) was weighted into a 30 mil Hypo-seal vial and crimp sealed with a PTFE coated silicone rubber septum. The vial was heated to 80° C. for 30 mins. to liberate the R-134a from the extract. The vial was removed from the oven and pressurized with 20 mls of air from a syringe. The syringe was then allowed to refill and immediately injected onto the GC via a gas sample valve. The GC had been previously calibrated. The results were then calculated in % (or ppm) w/w R-134a/weight of biomass or extract. The limit of detection was around 50 ppm w/w R-134a in the extract.

Figure 4:
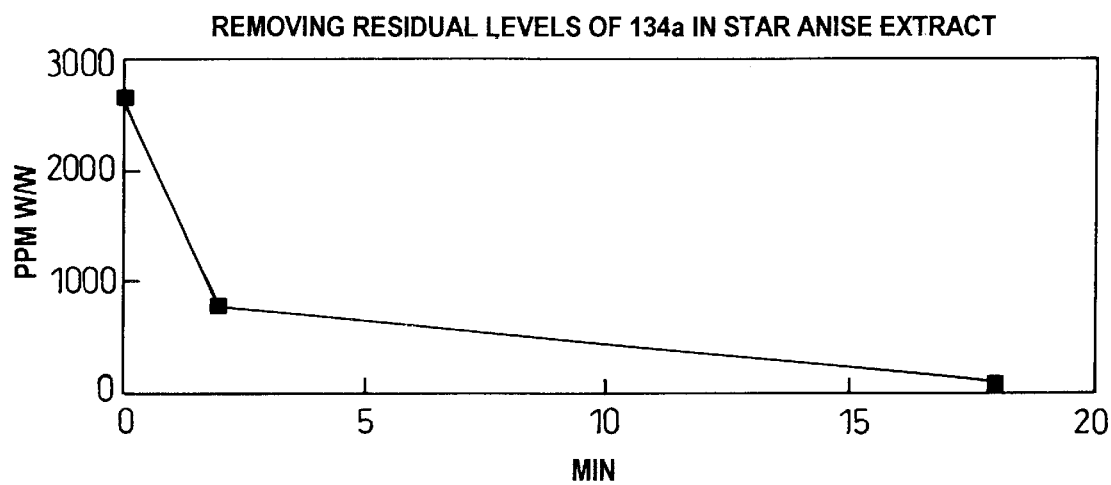
FIGS. 4 and 5 are art graphs illustrating the results of comparative experiments including the method of the invention.
Figure 5:
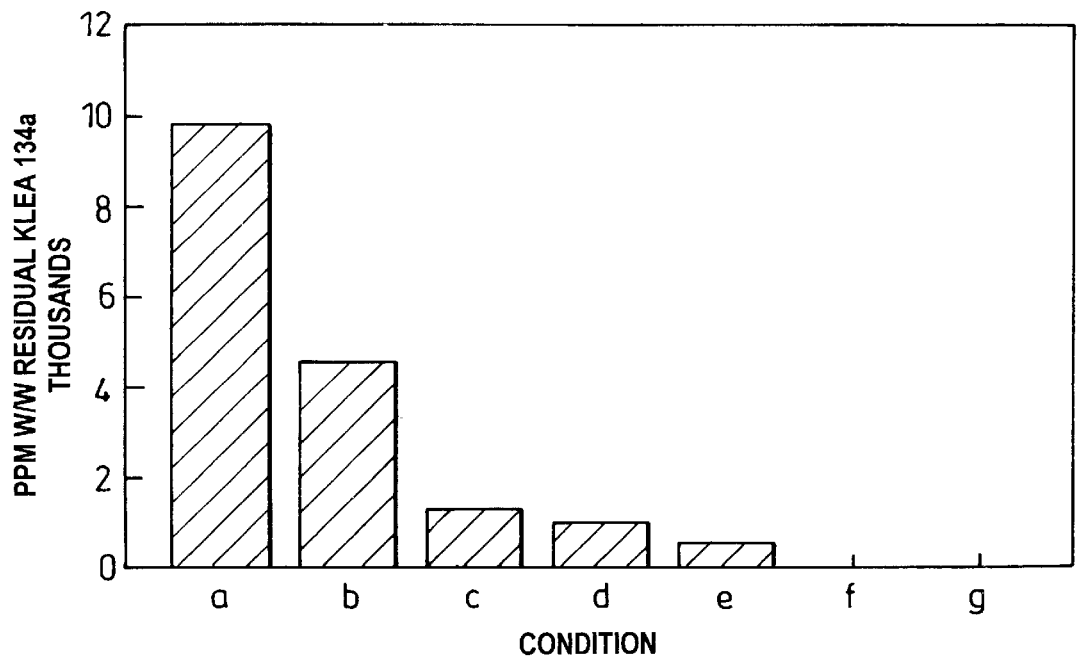

FIGS. 4 and 5 show the results of the treatments.

DISCUSSION

For the star anise extract used in this experiment the use of vacuum and heat (40° C.) will remove the relatively large quantities of residual R-134a in a relatively short space of time (i.e., 2,700 to 100 ppm w/w in less than 20 mins.) but with prolonged time required for further reduction. Similar results are expected from other extracts.

It can be seen from FIG. 5 that the most effective means of removal of R-134a is the nitrogen sparge method (10,000 to <1 ppm w/w in 10 mins.). This method also has the added advantage of not requiring any heat treatment of the extract. In addition nitrogen sparging provides an inert atmosphere for further storage.

What is claimed is:

1. Apparatus for reducing residual solvent levels in a substance extracted from biomass, the apparatus comprising a vessel containing said substance in liquid form and contaminated with said residual solvent levels of HFC solvent; and a gas supply for sparging said substance in liquid form and said residual solvent levels of HFC solvent with a solvent stripping vapor, wherein the gas supply includes a hollow wand having a gas outlet and being connected to a source of pressurized solvent stripping vapor, whereby the solvent stripping vapor flows from the source through the hollow wand to exit via the gas outlet, the gas outlet of the wand being movably immersed in the said substance in liquid form and residual levels of HFC solvent to permit sparging thereof by the solvent stripping vapor.

2. Apparatus according to claim 1 wherein the gas supply supplies air and nitrogen for sparging of said substance extracted from biomass.

3. Apparatus according to claim 1 wherein the gas supply supplies air or nitrogen for sparging of said substance extracted from biomass.

4. A method of reducing residual solvent levels in a substance extracted from biomass, the method comprising sparging said substance extracted from biomass in liquid form and contaminated with said residual solvent levels of an HFC solvent with a solvent stripping vapor supplied via a hollow wand having a gas outlet and being connected to a source of pressurized solvent stripping vapor, whereby the solvent stripping vapor flows from the source through the hollow wand to exit via the gas outlet, the gas outlet of the wand being moveably immersed in said substance in liquid form and residual levels of HFC solvent to permit sparging thereof by the solvent stripping vapor.

5. A method according to claim 4 wherein the solvent stripping vapor comprises air or nitrogen.

6. A method according to claim 4 wherein the solvent stripping vapor comprises air and nitrogen.

* * * * *